Oct. 25, 1960     E. D. HOBBS     2,958,034
GENERATING CONTROL SYSTEMS
Filed March 28, 1958
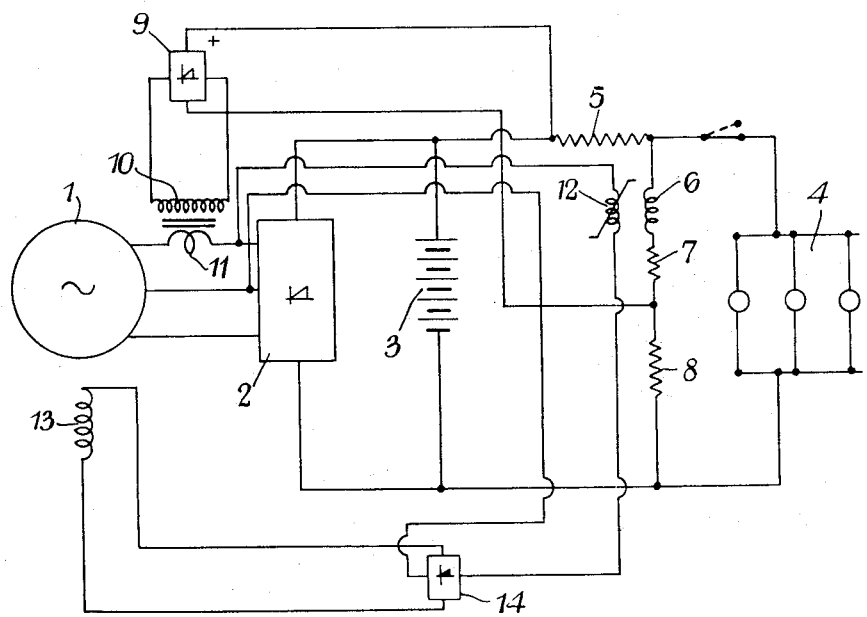
Inventor
Edwin Daniel Hobbs
by Sommers & Young
Attorneys

United States Patent Office 2,958,034
Patented Oct. 25, 1960

2,958,034

GENERATING CONTROL SYSTEMS

Edwin Daniel Hobbs, Chislehurst, England, assignor to J. Stone & Company (Deptford) Limited, Deptford, London, England Filed Mar. 28, 1958, Ser. No. 724,696

Claims priority, application Great Britain May 23, 1957

4 Claims. (Cl. 322—25)

This invention concerns improvements relating to battery-charging systems, particularly such forming part of electrical supply systems on railway vehicles for lighting, heating and/or similar purposes. Systems in which the power is derived from running axles of vehicles present particular problems with respect to their regulation. An object of the invention is to provide for effective regulation of a battery-charging system by simple means and without using regulators with moving parts.

The conventional arrangement for obtaining a dual battery-limiting characteristic, that is current-responsive or current-limiting regulation up to a certain point followed by voltage-responsive or voltage-limiting regulation, employs a current-responsive regulating winding in the output of the generator. With the load (that is the load other than the battery) switched off, the full regulated current is then delivered to the battery. For example, with a regulated current of 100 a., equal to the generator rating, and a load of 60 a., the charging current will increase from 40 to 100 a. when the load is switched off. Such an increase may be detrimental to the life of certain types of battery. To avoid this drawback, the current responsive regulating winding may be connected in the battery lead and the control current at which regulation occurs may be set to the difference between the generator rating and the load, namely to 40 a. in the above example. The charging current would then never exceed 40 a., but the full generator rating is used only with full load. Furthermore, if the load is increased for any reason without reducing the setting of the control current, the generator will be overloaded. However, in practice, precautions are generally taken in such systems to preclude unauthorised increase of load in order to prevent increase of the discharge rate from the battery.

Direct application of the last-described arrangement to a dual-characteristic battery-charging system comprising a source of alternating current and rectifiers involves difficulties because the charging current is direct current and the generator output is alternating current. The present invention therefore seeks to provide an equivalent arrangement for a system of this kind.

According to the invention, in an arrangement comprising a generator providing a source of alternating current, for charging a battery and supplying other load, a regulator control winding is supplied through rectifiers with voltages varying with the generator alternating voltage and the generator alternating current respectively and the voltage varying with the said current is applied across a so-called lamp resistance and the said winding in series. By a lamp resistance is meant a resistance which is connected between the battery and other load and which carries the current to the said other load, at least when the battery is on charge.

The manner of operation of such an arrangement will be better understood by reference to a particular example, for which the circuit diagram is illustrated in the accompanying drawing.

In this example, the generator is a three-phase alternator 1 which is connected to a main rectifier 2 from which a battery 3 is charged and a load 4, for instance a lamp load, is supplied with direct current, a lamp resistance 5 being connected between the battery and the load in the usual manner. The single main control winding 6 of an excitation regulator, of the saturable-reactor type, for the alternator is connected in series with a tempertaure-compensating resistor 7 and other resistance 8 across the load 4. It is thus in a shunt circuit in relation to the battery 3 and will respond to charging voltage.

In addition, the winding 6, its temperature-compensation resistor 7 and the lamp resistance 5, in series, are connected across the output of a further rectifier 9 whose input is connected to the secondary 10 of a current transformer having its primary 11 in one of the output lines of the alternator 1.

The excitation regulator may be of simple well known type and is indicated purely diagrammatically in the drawing, where its alternating current winding 12 is shown connected to the alternator-excitation winding 13 through a rectifier 14.

To explain the operation, typical values will be assumed: Let the lamp resistance 5 be designed to give a voltage drop of 3 v. with a full load of 60 a., the alternator rating being 100 a. The shunt circuit 6, 7, 8 is set so that the regulator will provide voltage control at 30 v. The actual voltage drop across the control winding 6 and temperature-compensation resistor 7 is 2 v. At 100 a. output from the alternator, the transformer 10, 11 is designed to produce 5 v. at the output of its rectifier 9.

At full load and with discharged battery, the transformer 10, 11 will produce 5 v. across the lamp resistance 5, winding 6 and resistor 7, just causing the regulator to operate and limit the alternator output to 100 a., providing of course that the battery voltage is below 30 v. on charge. Under these conditions, the battery 3 will receive a charge of 40 a.

If the load 4 is switched off, the voltage drop across the lamp resistance 5 due to the load current will be reduced to zero and consequently the voltage drop across the said resistance 5, winding 6 and resistor 7 will be reduced to 2 v., so that the alternator output cannot exceed $\frac{2}{5} \cdot 100 = 40$ a. Thus the battery 3 still receives a charge of 40 a.

If the alternator 1 is designed in well known manner to be inherently current limiting, that is to hold its output-current within a predetermined maximum value without external intervention, then the above described arrangement can still be employed with advantage, as it will again protect the battery, whilst the alternator itself is also protected against being overloaded.

I claim:

1. A supply system comprising a generator with an alternating-current output circuit, a rectifying means, a battery to be charged by the current generated by said generator and another load to be supplied thereby connected to said output circuit through the said rectifying means, a lamp resistance connected between the said battery and said other load, the said rectifying means being connected in series with said output circuit for producing a rectified voltage varying with the generator alternating voltage, and a sensing means sensing the current flowing in said output circuit and producing an alternating voltage which varies with said current, and a second rectifying means connected to said sensing means for producing a rectified voltage varying with the generator alternating current, and a regulator having a control winding connected to both of said rectifiers, thus being supplied through them with the said voltages varying with the generator alternating voltage and the generator alternating current respectively, and the said winding being connected across the second named rectifier in series with the lamp resistance so that the voltage varying with said current is applied across the said winding and resistance in series.

2. A supply system as claimed in claim 1, wherein the regultaor is of the saturable-reactor type.

3. A supply system as claimed in claim 1, wherein the control winding is connected across the load, that is, connected to the lamp resistance on the side remote from the battery, and said sensing means is a current transformer.

4. A supply system as claimed in claim 1, wherein the generator is an inherently current-limited alternator.

References Cited in the file of this patent
UNITED STATES PATENTS

| | | |
|---|---|---|
| 2,519,370 | Herchenroeder | Aug. 22, 1950 |
| 2,660,702 | Arvidsson | Nov. 24, 1953 |
| 2,707,263 | Jorgenson | Apr. 26, 1955 |